United States Patent [19]
Boldrini et al.

[11] Patent Number: 5,275,275
[45] Date of Patent: Jan. 4, 1994

[54] METHOD OF TRANSFERRING PRODUCTS BETWEEN CONTINUOUSLY-MOVING CONVEYORS

[75] Inventors: Fulvio Boldrini, Ferrara; Antonió Gamberini, Bologna, both of Italy

[73] Assignee: G.D Societa' Per Azioni, Bologna, Italy

[21] Appl. No.: 919,859

[22] Filed: Jul. 27, 1992

[30] Foreign Application Priority Data

Jul. 29, 1991 [IT] Italy .................. B091A 000283

[51] Int. Cl.⁵ .................................................. B65G 29/00
[52] U.S. Cl. ...................................... 198/482.1; 198/605
[58] Field of Search ............... 198/482.1, 483.1, 468.2, 198/468.6, 605, 611; 53/234

[56] References Cited

U.S. PATENT DOCUMENTS

| | | | |
|---|---|---|---|
| 1,766,018 | 6/1930 | Flook | 198/482.1 |
| 3,039,587 | 6/1962 | Pollmann | 198/482.1 X |
| 3,570,647 | 3/1971 | Meikle et al. | 198/483.1 X |
| 4,116,325 | 9/1978 | McDonald | 198/482.1 |
| 4,559,757 | 12/1985 | Folke et al. | 198/605 X |
| 4,883,161 | 11/1989 | Focke | 198/482.1 X |

FOREIGN PATENT DOCUMENTS

| | | | |
|---|---|---|---|
| 294252 | 12/1979 | Fed. Rep. of Germany . | |
| 371332 | 4/1987 | Fed. Rep. of Germany . | |
| 3929982 | 9/1989 | Fed. Rep. of Germany . | |
| 0601130 | 4/1978 | U.S.S.R. | 198/482.1 |

*Primary Examiner*—Robert P. Olszewski
*Assistant Examiner*—James R. Bidwell
*Attorney, Agent, or Firm*—Klauber & Jackson

[57] ABSTRACT

Products fed by a first conveyor at substantially constant speed along a first substantially circular path and inside respective first seats are transferred successively into respective second seats on a second conveyor by which each second seat is advanced at a speed equal to that of the first conveyor along a second path tangent to the first path; which transfer is effected by a pusher and a counterpusher cooperating respectively with the first and second conveyors, and moving both parallel and perpendicular to the respective path;

the pusher moving, during transfer, both parallel and perpendicular to the second path and in time with the counterpusher.

3 Claims, 2 Drawing Sheets

METHOD OF TRANSFERRING PRODUCTS BETWEEN CONTINUOUSLY-MOVING CONVEYORS

BACKGROUND OF THE INVENTION

The present invention relates to a method of transferring products between continuously-moving conveyors.

More specifically, the present invention relates to a method of transferring products from a first to a second conveyor by which the products are conveyed respectively at substantially constant speed along a first and second path tangent to each other, and at least the first of which is a curved path.

The present invention is particularly suitable for use on cigarette manufacturing machines, in particular, cigarette packing machines, to which the following description refers purely by way of example.

On known cigarette packing machines, said first conveyor consists of a packing wheel having a number of peripheral seats which, as the wheel is rotated about its axis, are fed through a loading station where each seal is fed with a preformed group of cigarettes, preferably foil-wrapped, and a blank which is folded partially about the group as this is inserted inside the seat. As it is fed by the packing wheel along a circular path, each blank is gradually folded about the group to form a packet, which is normally completed, by a final folding operation, as the packet is transferred from the packing wheel to said second conveyor consisting of an output conveyor substantially tangent to the packing wheel.

On known packing machines of the aforementioned type, the first and second conveyor are normally step-operated, so that the products are transferred without difficulty as the conveyors are arrested between one step and the next.

SUMMARY OF THE INVENTION

It is an object of the present invention to provide a straightforward, low-cost, reliable method of transferring packets of cigarettes between said first and second conveyor on a packing machine wherein the conveyors are continuously-moving types.

According to the present invention, there is provided a method of transferring products between continuously-moving conveyors, said products being fed by a first conveyor at substantially constant speed along a first curved path and into respective first seats, and being transferred successively into respective second seats on a second conveyor by which each second seat is advanced at said speed along a second path substantially tangent to the first; said method being characterized by the fact that said transfer is effected by means of a pusher and a counterpusher respectively cooperating with said first and second conveyor, and moving both parallel and perpendicular to the respective path; the pusher presenting an additional degree of freedom as compared with the counterpusher, and moving, during transfer, both parallel and perpendicular to the second path and in time with the counterpusher.

The above method preferably comprises stages consisting in bringing the pusher into contact with the product, while at the same time maintaining the pusher radially aligned with the respective said first seat as this is fed by the first conveyor along said first path towards the point of tangency with the second path; simultaneously moving the counterpusher both parallel to the second path and towards said point of tangency, and perpendicular to the second path and gradually into engagement with said second seat, so as to contact the product close to said point of tangency; jointly moving the pusher and counterpusher both parallel and perpendicular to the second path, so as to transfer the product from the first to the second seat at said point of tangency; and releasing both the counterpusher from said second seat, and the pusher from said first seat.

Finally, said stage wherein the pusher is released from said first seat is preferably effected by moving the pusher along a path substantially parallel to the first path and into a position wherein it is substantially aligned radially with the first seat; and by moving the pusher through the first seat in a substantially radial direction in relation to the first path.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
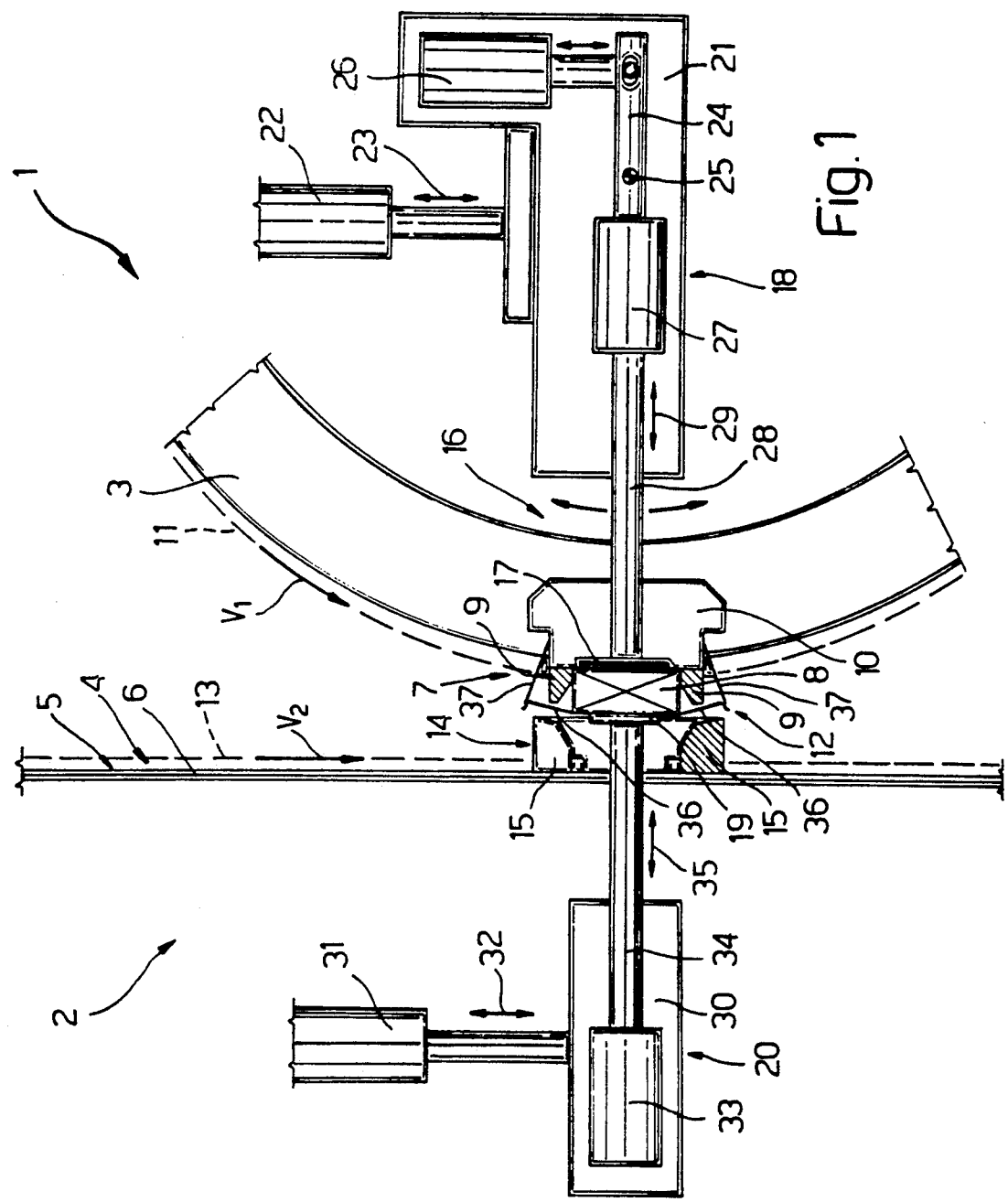
FIG. 1 shows a schematic, partially sectioned side view, with parts removed for clarity, of a portion of a cigarette packing machine featuring a transfer device implementing the method according to the present invention.

Number 1 in FIG. 1 indicates a cigarette packing machine of the type described in Italian Patent Application N. B091A 000019 to which full reference is made herein in the interest of full disclosure.

Machine 1 comprises an output portion 2 defined by a first conveyor consisting of a known packing wheel 3 rotating at a substantially constant surface speed V1 about its axis (not shown) perpendicular to the FIG. 1 plane; and by a second conveyor consisting of a conveyor 4, the belt 5 of which comprises a straight branch 6 extending parallel to the FIG. 1 plane, facing the outer edge of wheel 3, and moving axially at a speed V2 substantially equal, in absolute value, to speed V1.

The outer edge of wheel 3 presents a number of equally-spaced through seats 7, each designed to receive a respective packet of cigarettes 8, and defined laterally by two shoulders 9 extending axially in relation to wheel 3. Shoulders 9 are supported on a base plate 10 connected integral with an end surface of wheel 3, and project radially outwards in relation to wheel 3.

As wheel 3 is rotated about its axis, seats 7 are fed along a curved, more specifically, circular path 11 substantially tangent at point 12 to the substantially straight path 13 of a number of seats 14 equally spaced along belt 5 with the same spacing as seats 7.

Like seats 7, each seat 14 is defined laterally by two shoulders 15 parallel to shoulders 9 and connected to the outer surface of belt 5. More specifically, branch 6 of belt 5 is arranged directly facing the edge of wheel 3, and shoulders 15 project laterally from belt 5 so as to face shoulders 9 as they travel along branch 6.

In addition to wheel 3 and conveyor 4, output portion 2 of machine 1 also comprises a device 16 for transferring packets 8 from wheel 3 to conveyor 4 at the point of tangency 12.

Device 16 comprises a pusher 17 cooperating with wheel 3 and consisting of a plate engaged and moved successively through seats 7 by an actuating device 18; and a counterpusher 19 cooperating with conveyor 4 and consisting of a plate engaged and moved successively through seats 14 by an actuating device 20.

In actual practice, actuating devices 18 and 20 consist of relatively complex crank mechanisms (not shown), which, according to the manner in which pusher 17 and counter pusher 19 are operated, may be illustrated theoretically as shown in the accompanying drawings.

More specifically, device 18 may be represented as consisting of a platform 21 housed inside wheel 3 and moved, by a first double-acting linear actuator 22, in direction 23 parallel to path 13; a rocker arm 24 pivoting on platform 21 and rotated about an axis 25 parallel to the rotation axis of wheel 3 by a second double-acting linear actuator 26 supported on platform 21 and connected to a first arm of rocker arm 24; and a third double-acting linear actuator 27 connected coaxially to a second arm of rocker arm 24, and having an output rod 28 connected integral with pusher 17 and moved axially by actuator 27 in direction 29.

Device 20, on the other hand, may be represented as consisting of a platform 30 located on the opposite side of branch 6 of belt 5 as compared with wheel 3, and moved, by a first double-acting linear actuator 31, in a direction 32 parallel to direction 23 and path 13; and a second double-acting linear actuator 33 supported on platform 30 and having output rod 34 connected integral with counterpusher 19 and moved axially by actuator 33 in direction 35 perpendicular to path 13.

As a consequence of the above design of actuating devices 18 and 20, pusher 17, by virtue of being able to move, not only in directions 23 and 29 respectively parallel and perpendicular to path 13, but also to rotate about axis 25 so as to move parallel to path 11, presents an additional degree of freedom as compared with counterpusher 19, which is only permitted to move in directions 32 and 35 respectively parallel and perpendicular to path 13.

In actual use, each packet 8 is fed, partially folded, by wheel 3 to point of tangency 12, the final folding operation being performed as packet 8 is transferred from wheel 3 to conveyor 4. More specifically, and as shown in the accompanying drawings, each packet 8 presents two longitudinal tabs 36, which, as packet 8 approaches the point of tangency 12, still extend outwards of shoulders 9, and are supported by respective elastic arms 37.

Figure 2:
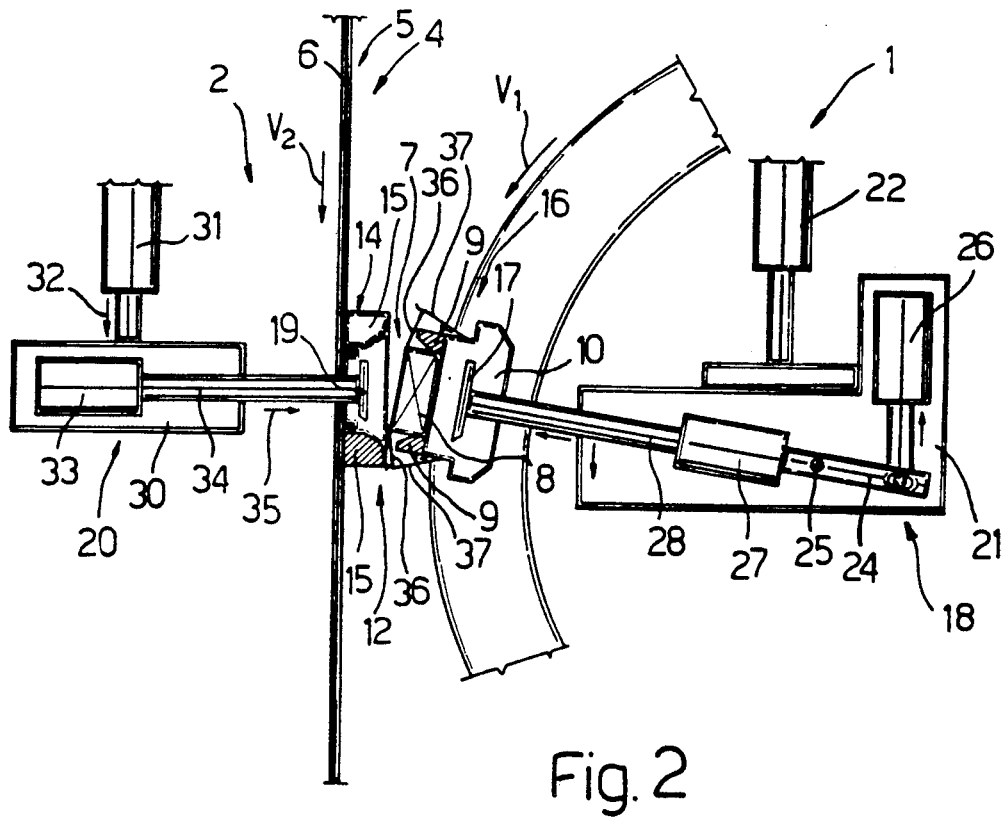
FIGS. 2 and 3 show the same view of the FIG. 1 device in a further two operating positions.

As packet 8 on wheel 3 approaches the point of tangency 12, actuating device 18 is set to an idle position substantially as shown in FIG. 2, wherein axis 25 of rocker arm 24 substantially coincides with the axis of wheel 3, and rod 28 is positioned radially inward in relation to the edge of wheel 3. As a seat 7 approaches pusher 17, actuator 26 is operated so as to rotate rocker arm 24 about axis 25, and so move pusher 17 parallel to path 11, and eventually bring and maintain it in line with seat 7. Once positioned immediately upstream from the point of tangency 12, pusher 17 is moved by actuator 27 in direction 29 and into contact with packet 8 inside seat 7 (FIG. 1).

At the same time, actuating device 20, originally set to an idle position substantially as shown in FIG. 2, is activated by operating actuator 31, which moves platform 30 parallel to path 13 and towards the point of tangency 12, so as to eventually bring and maintain counterpusher 19 in line with an empty seat 14, which is advanced by belt 5 in such a manner as to reach point 12 simultaneously with said seat 7. Once positioned immediately upstream from the point of tangency 12, counterpusher 19 is moved by actuator 33 in direction 35 perpendicular to path 13, and through seat 14 into contact with packet 8 inside seat 7 (FIG. 1).

At this point, actuators 22 and 31 continue moving respective platforms 21 and 30 parallel to and at the same speed as branch 6 of belt 5, and actuators 27 and 33 move pusher 17 and counterpusher 19, in time with each other, perpendicularly towards branch 6, so as to remove packet 8 from seat 7 and insert it inside seat 14, while at the same time folding tabs 36 against shoulders 15 of seat 14.

Once packet 8 has been transferred, counterpusher 19 continues moving in direction 35, so as to free seat 14 and enable actuator 31 to return platform 30 to its original idle position pending the arrival of the next packet 8 on wheel 3.

Figure 3:
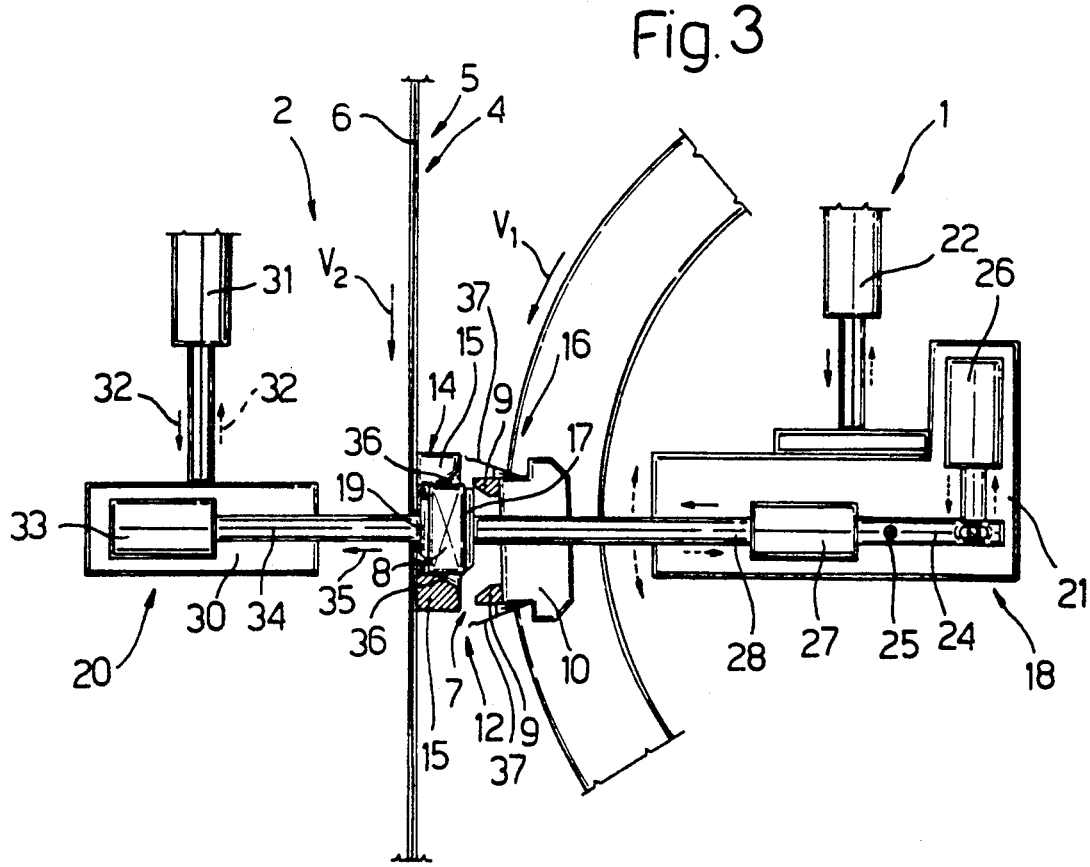

As regards pusher 17, on the other hand, following expulsion of packet 8 from seat 7 perpendicular to branch 6 of belt 5, pusher 17 (FIG. 3) is no longer aligned radially with seat 7, and must therefore be realigned to enable it to be withdrawn inside wheel 3 through seat 7. This is effected by actuator 26 raising the arm of rocker arm 24 to which it is connected, and so rotating rocker arm 24 anticlockwise in FIG. 3; and by actuator 22 resetting axis 25 so that it substantially coincides with the axis of wheel 3.

The above rotation of pusher 17 by actuator 26 is maintained until pusher 17 is withdrawn inside wheel 3 through seat 7 by actuator 27 moving it radially in relation to path 11, at which point, it is restored by actuators 26 and 22 to its original idle position pending the arrival of the next packet 8 on wheel 3.

From the foregoing description, it will be clear that, only by virtue of said additional degree of freedom of pusher 17 as compared with counterpusher 19, is it possible for pusher 17 to be withdrawn from seat 7 as it is restored to its original idle position.

We claim:

1. A method of transferring products (8) between continuously-moving conveyors, said products (8) being fed by a first conveyor (3) at substantially constant speed along a first curved path (11) in respective first seats (7), and being transferred successively into respective second seats (14) on a second conveyor (4) by which each second seat (14) is advanced at said constant speed along a second path (13) substantially tangent to the first (11) curved path; said method being characterized by the fact that said transfer is effected by means of a pusher (17) and a counterpusher (19) respectively cooperating with said first (3) and second (4) conveyors, and moving both parallel and perpendicular to their respective path paths (11, 13); the pusher (17) presenting an additional degree of freedom as compared with the counterpusher (19), and moving, during transfer, both parallel and perpendicular to the second path (13) and in time with the counterpusher (19).

2. A method as claimed in claim 1, characterized by the fact that it comprises stages consisting in brining said pusher (17) into contact with said product (8), while at the same time maintaining said pusher (17) radially aligned with the respective said first seat (7) as this is fed by said first conveyor (3) along said first path (11) towards the point of tangency (12) with said second path (13); simultaneously moving said counterpusher (19) both parallel to said second path (13) and towards said point of tangency (12), and perpendicular to said second path (13) and gradually into engagement with said second seat (14), so as to contact said product (8) close to said point of tangency (12); jointly moving said pusher (17) and said counterpusher (19) both parallel and perpendicular to said second path (13), so as to transfer said product (8) from said first (7) to said second (14) seat at said point of tangency (12); and releasing both said counterpusher (19) from said second seat (14), and said pusher (17) from said first seat (7).

3. A method as claimed in claim 2, characterized by the fact that said stage wherein said pusher (17) is released from said first seat (7) is effected by moving said pusher (17) along a path substantially parallel to said first path (11) and into a position wherein it is substantially aligned radially with said first seat (7); and by moving said pusher (17) through said first seat (7) in a substantially radial direction in relation to said first path (11).

* * * * *